United States Patent [19]

Nakamura

[11] 4,421,470
[45] Dec. 20, 1983

[54] RESIN PELLET PRODUCING MACHINE

[76] Inventor: Kensaku Nakamura, 271-1, Bessho-cho, Matsubara, Osaka-Pref., Japan

[21] Appl. No.: 354,641

[22] Filed: Mar. 4, 1982

[51] Int. Cl.$^3$ .............................................. B29C 17/14
[52] U.S. Cl. .................................. 425/311; 425/313; 425/379 R
[58] Field of Search ............ 425/310, 311, 313, 379 R

[56] References Cited

U.S. PATENT DOCUMENTS

| 3,230,582 | 1/1966 | Hoffman et al. | 425/311 |
| 3,341,892 | 9/1967 | Mayner | 425/313 |
| 3,452,394 | 7/1969 | McNeal | 425/311 |
| 3,749,539 | 7/1973 | Galbreath | 425/313 |
| 3,753,637 | 8/1973 | Gasior | 425/313 |
| 3,933,958 | 1/1976 | Hinrichs | 264/40.6 |
| 4,120,625 | 10/1978 | Heckeroth | 425/313 |
| 4,269,584 | 5/1981 | Kroll | 425/311 |

FOREIGN PATENT DOCUMENTS 2455757 6/1976 Fed. Rep. of Germany ...... 425/311

*Primary Examiner*—James H. Derrington
*Attorney, Agent, or Firm*—Moonray Kojima

[57] ABSTRACT

This invention is concerned with an improved construction of resin pellet producing machine so adapted that a length of resin material extruded in a circular shape through a die of an extruding means is cooled down by a quantity of cooling water jetted forth from a cutter nozzle and at the same time cut continuously to form a plurality of resin pellets thereby to make it unnecessary to appeal further to a cooling water tank.

2 Claims, 4 Drawing Figures

RESIN PELLET PRODUCING MACHINE

BACKGROUND OF THE INVENTION

According to most of the conventiona resin pellet producing machines for cutting a length of resin material extruded in a linear shape from a die of an extruder, the continuity if forced into a cooling water tank so as to be cooled and hardened, thereafter being cut into pieces.

However, the above-mentioned type machines have disadvantages in that a cooling water tank cannot but be elongated in structure since a length of resin material extruded in a linear line must be past throuh the tank; this has results that it is necessary to provide an area wherein the machine is placed, and further the cost for equipping a cooling water tank is prohibitively expensive.

Further inasmuch as a lenth of linear resin material is continuously forced out from a die, it is apt to be cut midway thereof and in this case, there is brought about a difficulty with which the die must be set again in its original position.

In the meanwhile, in order to mitigate the foregoing disadvantages of the conventional type machines there is proposed an underwater cutting method according to which a water chamber is provided externally of a die of an extruding means whereby a length of resin material extruded from the die is cut in the water by means of a cutting means provided in the However, according to the above-mentioned underwater cutting method, a water chamber is always to have heated cooling water be past therethrough so that a considerable quantity of water is consumed, with an additional disadvantage that a big cost is needed for heating water and keeping the heated water at a heated temperature.

OBJECTS OF THE INVENTION

Accordingly, the present invention has been contrived to eliminate all the above-mentioned drawbacks and disadvantages, having for one of its main objects the provision of a resin pellet producing machines adapted to cool and harden a length of resin material, once extruded from a mold hole, and immediately cutting a length of resin material into a pieces thereby to dispose with a cooling water tank which otherwise might be needed for most of the conventional type machines, the result being that the machine of the invention is constructed dimensionally in a smaller size and placeable in a smaller surface area compared with the conventional type machines.

Another object of the invention is to provide a resin pellet producing machine so constructed that a cooling water is forcibly past through a cutter means to be jetted forth from a cutter nozzle toward the foremost end of a cutting blade so that the foremost end is not only produced from being burnt thereby to elongate the life of the cutter means to an excess but also prevented from being stuck to by some quantity of resin material, the result being that resing cutting can be carried out as effectively as ever.

Another object of the invention is to provide a resin pellet producing machine which, compared with any underwater resin cutting means provided with a cutter chamber, a small quantity of cooling water to be jetter forth can be consumed, thus excessively saving expenditures for consumption of water.

A further object of the invention is to provide a resin pellet producing machine wherein a cooling water jetted forth through a cutter water jetted forth through a cutter nozzle toward the foremost end of a cutting blade is replaced with a heated water containing barrel for cooling water, thus unnecessitating a particular additional means for heating a quantity of cooled water to result in a quantity of water for cooling the barrel being used as effectively as possible.

A still object of the invention is to provide a resin pellet producing machine wherein a heater means is buried within a die that is always being cooled by cooled water when in operation whereby the die is prevented from being cooled to an excessive degree of temperature and can kept at a suitable temperature. This has results that a quantity of resin material is smoothly fed through the die and fixed size of resin pellets can be effectively produced.

BRIEF DESCRIPTION OF DRAWING RELATING TO THE INVENTION

In the accompanying drawings.

DETAILED DESCRIPTION OF INVENTION

Figure 1:
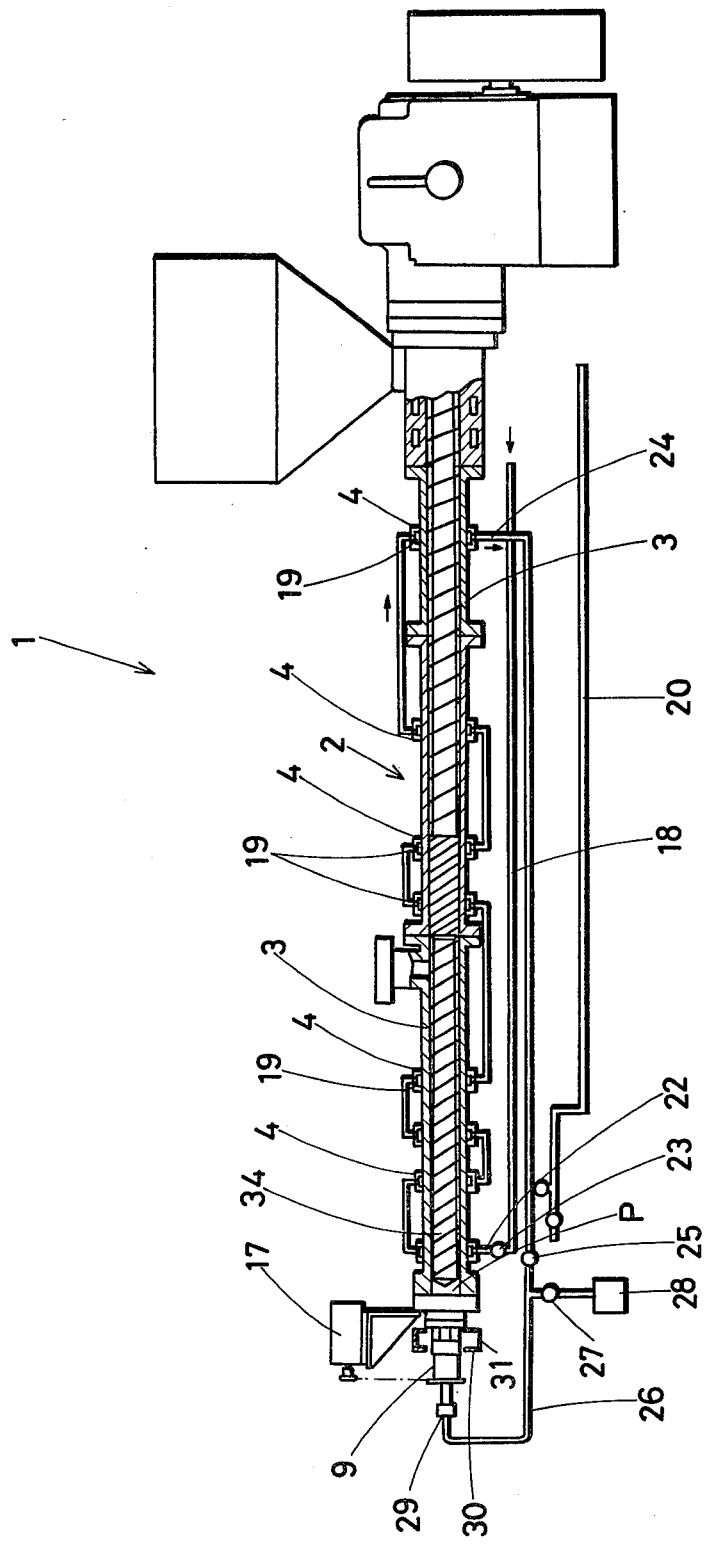
FIG. 1 is a cross-sectional elevation showing as the whole a resin pellet producing machine of the invention.

Setting forth now in details some preferred embodiments of the invention with reference to the accompanying drawings wherein numeral 1 generally designates a resin pellet producing machine mainly comprising an extruder means 2 and a barrel 3 having a heater means 4 circumferentially thereof.

Said barrel 3 is provided in its foremost edge with a die 5 having centrally thereof a plurality of mold holes 6 which are adapted to to extrude a quantity of molten resin material P in a linear shape. Said mold holes 6 are gradually tapered toward an exit thereof.

Figure 2:
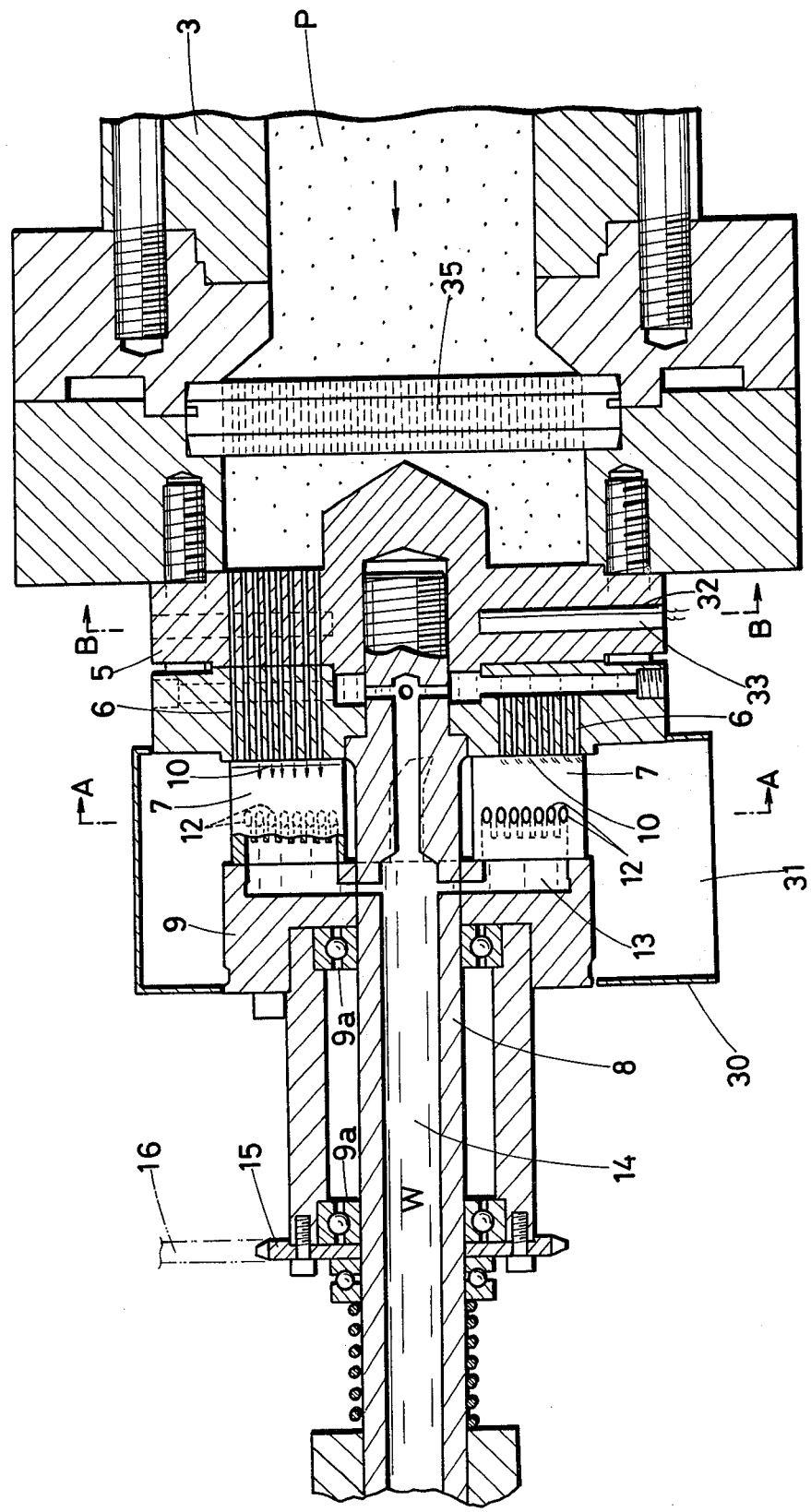
FIG. 2 is a partially enlarged elevation of a die portion of the machine of the invention.
Figure 3:
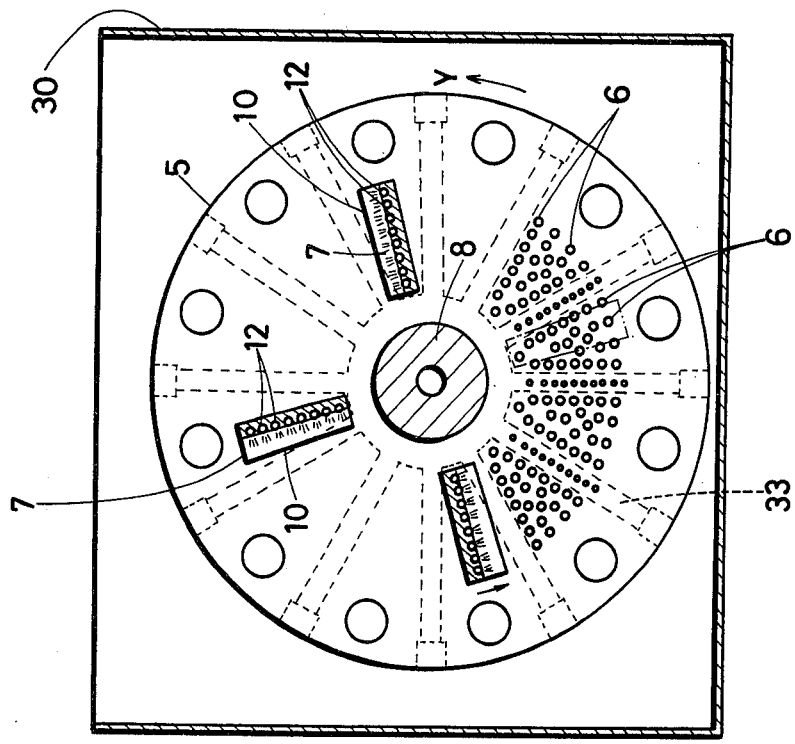
FIG. 3 is a cross-sectional elevation taken on the line A—A in FIG. 2.
Figure 4:
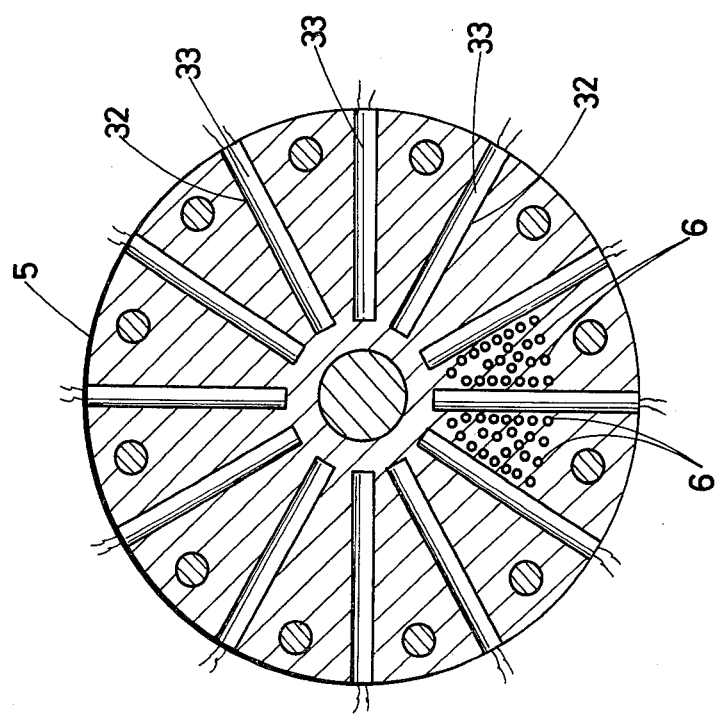
FIG. 4 is a cross-sectional elevation taken on the line B—B thereof.

As shown in FIGS. 2 and 3, a cutter means 7 are rigidly fixed at suitably spaced apart intervals on the outer circumference of an end of a rotary stand 9 rotatably supported through bearing means 9a on the outer periphery of a rotary shaft 8 rigidly mounted amidst said die 5, the foremost end 10 of said cutter means 7 being disposed in slidably contactable relation with an outer surface area 11 formed by opening of said die 5.

In the inside of said cutter means 7 there are formed a plurality of nozzle holes 12 and intercommunicated with a cooling water passageway 14 of said rotary shaft 8 through 13 provided in said rotary shaft 8.

Said rotatably supporting stand 9 is adapted to rotate by means of a torque motor 17 through a chain 16 wound on a sprocket 15 in the direction shown by an arrow Y in FIG. 3. A water feeding passageway 18 in FIG. 1 is adapted to feed a cooling water W into a cooling groove 19 provided in the inside of the heater means 4.

In order to drain the cooling water W, a draining pipe 20 is provided while a pipe 21 is provided to introduce a quantity of heated cooling water drained from the heater means 4. To said water feeding passageway 18 there is connected an inlet 22 of said cooling groove 19 of the heater means 4 through a valve 23 while an outlet 24 of said cooling groove 19 is connected to said pipe 21 which is also connected through a valve 25 to a water pressure passageway 26.

Said water pressure passageway 26 is also connected through a valve 27 to an air compressor 28, with an outlet 29 of said passageway 26 being connected to the cooling water passageway 14 of the rotary shaft 8 of said rotary supporting stand 9. Numeral 30 denotes a covering for preventing resin pellets from scattering in any directions, being mounted on the outer periphery of the cutter means 7, and provided with an outlet 31 for draining resin pellets and water in the lower portion of the covering 30.

Said die 5 is bored radially with a plurality of holes 32 wherein sheathed heater means 33 are buried, respectively so that said die 5 is not cooled down by the cooling water W, whereby a quantity of resin material streaming from the mold holes 6 toward an outlet thereof, being adapted to prevent the quantity from beihg hardened to block therein. Said heater means 33 is controllably adjustable by electricity.

Incidentally 34 is an extruding screw and 35 is a strand mounted at the side of an extruding portion of said barrel 3.

Referrence will now be made to the operational state of the above-mentioned resin pellet producing means 1 carrying out the invention wherein each of said valves 23, 25 and 27 is made open to allow the cooling water W to pass through the cooling groove 19 of the heater means 4 thereby cooling the barrel 3 and keep the same to a suitable degree of temperature.

Said cooling water W heated up by cooling said barrel 3 is moved through the pipe 21 to the water pressure passgeway 26 and then forcibly jetted out through the cooling water passageway 14 toward the foremost end 10 of the nozzle 12 of each cutter means 7 that is rotating. Thereafter the cooling water W is pushed out to a length of resin material extruded from the mold holes 6 of the die 5 into a linear line to cool down a quantity of molten resin material until the latter can be hardened enough to be cut into pieces.

A quantity of resin material that is forcibly pushed through the strand 35 from an outlet of said barrel 3 are cut into a pieces of pellets by means of the cutter means 7. These pellets are dropped together with water from the outlet 31 of the covering without being stuck with each other.

Through the cooling water W jetted out of the nozzle holes 12 of said cutter means 7 must be high in temperature, yet the resin pellet producing machine 1 of the invention is adapted to make use of the hot water that is cooled by means of the barrel 3 so that no particular heating means is necessary.

Moreover, the cooling water W is always fed to the foremost end of the cutter means 7 and blown against a quantity of resin material extruded from the mold holes 6 of the die 5 so that a conspiquously small quantity of water is used, compared with most of the conventional underwater cutting cutting machines that are constructed to cut the resin material by always circulating a great quantity of water within the cutter chamber.

Further according to the invention, it is clearly apparent that the foremost end 10 is always neither stuck to resin pellets nor said pellets are stuck to each other.

What is claimed is:

1. In a resin pelletizing apparatus, comprising
an extruding barrel comprising an elongated cylinder tube having an entrance end and an exit end and through which resin is processed;
heating means disposed about said barrel and comprising interconnected pipe means with an inlet and an outlet;
means for supplying hot water to said inlet of said interconnected pipe means to supply heat to said heating means;
die means positioned at said exit end of said extruder barrel for producing strands of extruded resin said die means having an outer surface area;
cutter means mounted on the outer surface area of said die means for cutting said strands into pellets; and
means for cooling the resulting pellets of said extruded resin;
wherein the improvement comprises a recirculating pipe means connected to said outlet of said interconnected pipe means and connected to said cooling means, whereby the water used to heat said barrel after exposure to said heating means is used to cool said pellets after cutting by said cutting means.

2. The apparatus of claim 1, wherein said die means comprises heating means disposed therein.

* * * * *